US009387592B2

(12) United States Patent
Asai

(10) Patent No.: US 9,387,592 B2
(45) Date of Patent: Jul. 12, 2016

(54) GAS-PRESSURE TYPE GRAVITY COMPENSATION ELEVATOR

(71) Applicant: Panasonic Corporation, Osaka (JP)

(72) Inventor: Katsuhiko Asai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 467 days.

(21) Appl. No.: 14/047,202

(22) Filed: Oct. 7, 2013

(65) Prior Publication Data

US 2014/0037412 A1 Feb. 6, 2014

Related U.S. Application Data

(63) Continuation of application No. PCT/JP2012/006481, filed on Oct. 10, 2012.

(30) Foreign Application Priority Data

Oct. 31, 2011 (JP) .................................. 2011-239193

(51) Int. Cl.
*B25J 19/00* (2006.01)
*B25J 15/00* (2006.01)
*B66C 23/00* (2006.01)

(52) U.S. Cl.
CPC .......... *B25J 15/0095* (2013.01); *B25J 19/0012* (2013.01); *B25J 19/0016* (2013.01); *B66C 23/005* (2013.01)

(58) Field of Classification Search
CPC ............ B25J 9/041; B25J 9/042; B25J 9/144; B25J 19/0008; B25J 19/0012; B25J 19/0016; B25J 19/002; G05B 2219/39194; G05B 2219/41114; F15B 1/021; F15B 1/024; F15B 1/045; F15B 11/0445; F15B 13/029; F15B 2211/05081; F15B 2211/5059; F16F 2230/0011
USPC .............................................. 414/673; 901/48
See application file for complete search history.

(56) References Cited

U.S. PATENT DOCUMENTS 4,588,346 A * 5/1986 Smith .................. B23Q 1/5475
269/71
4,705,447 A * 11/1987 Smith ...................... B23Q 1/48
269/71

(Continued)

FOREIGN PATENT DOCUMENTS

JP 5-32400 4/1993
JP 9-175800 7/1997

(Continued)

OTHER PUBLICATIONS

English translation of International Preliminary Report on Patentability issued May 15, 2014 in International (PCT) Application No. PCT/JP2012/006481.
International Search Report (ISR) issued Jan. 8, 2013 in International (PCT) Application No. PCT/JP2012/006481.

*Primary Examiner* — Ernesto Suarez
*Assistant Examiner* — Brendan Tighe
(74) *Attorney, Agent, or Firm* — Wenderoth, Lind & Ponack, L.L.P.

(57) ABSTRACT

There is provided a gas-pressure type gravity compensation elevator for ascending/descending a load object, which includes a control part. The control part is adapted to selectively connect a constant-pressure gas cylinder maintained at a constant pressure according to the grasping state, to a gas cylinder for exerting a driving force in the direction of ascent on an elevating mechanism. Further, the control part is adapted to control a sum of a volumes in the gas cylinder and the constant-pressure gas cylinder such that it equals to a sum of their average volumes, every time the grasping state is changed.

8 Claims, 6 Drawing Sheets

(56) References Cited

U.S. PATENT DOCUMENTS

| | | | | |
|---|---|---|---|---|
| 5,149,029 | A * | 9/1992 | Smith | B23Q 1/48 248/124.2 |
| 6,564,667 | B2 * | 5/2003 | Bayer | B25J 19/0016 267/291 |
| 8,522,540 | B2 * | 9/2013 | Runesson | B25J 19/0012 267/64.28 |
| 2010/0108965 | A1 | 5/2010 | Fujii | |

FOREIGN PATENT DOCUMENTS

| | | |
|---|---|---|
| JP | 3794743 | 4/2006 |
| JP | 2009-67530 | 4/2009 |
| JP | 2010-111464 | 5/2010 |
| JP | 2011-98821 | 5/2011 |

* cited by examiner

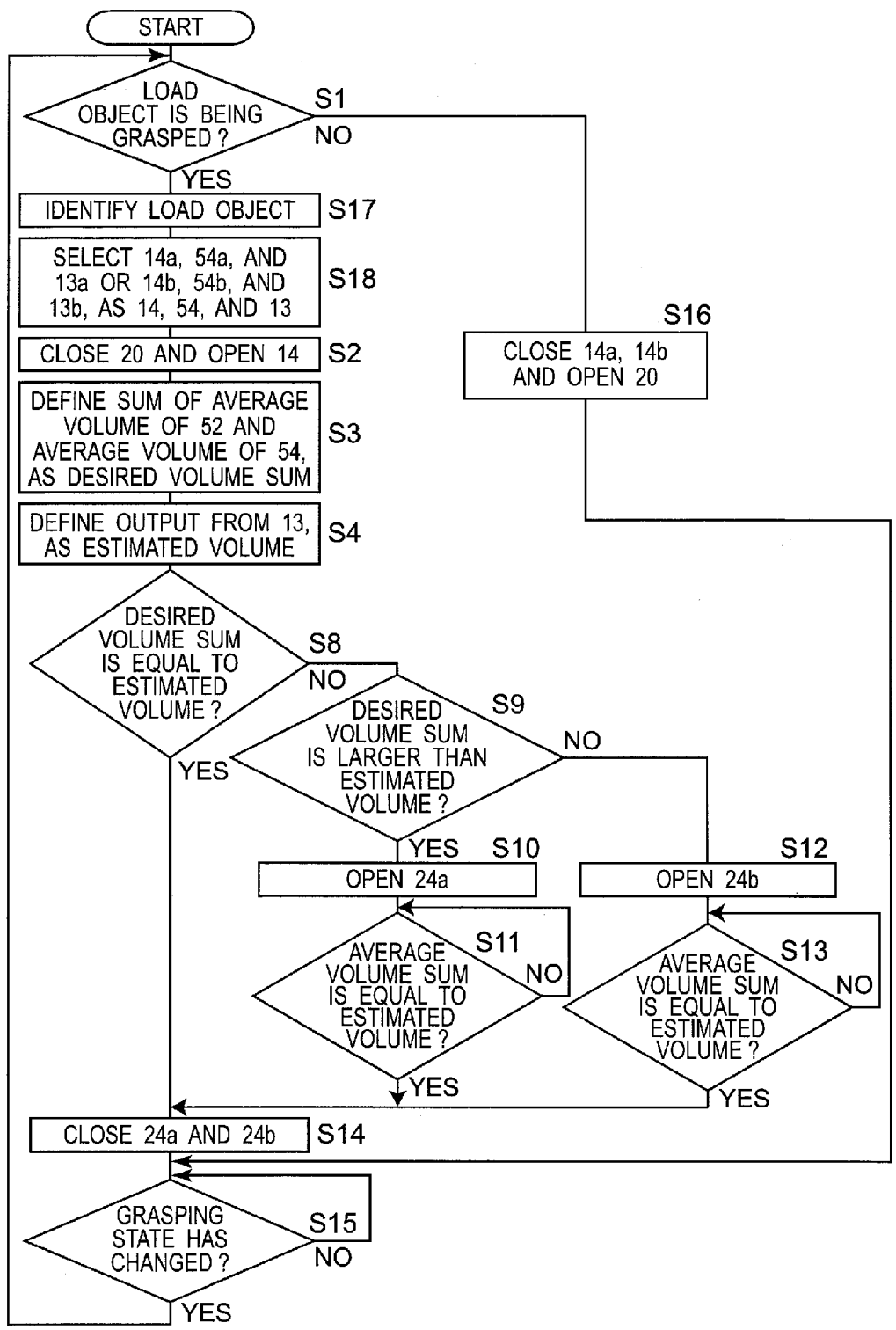

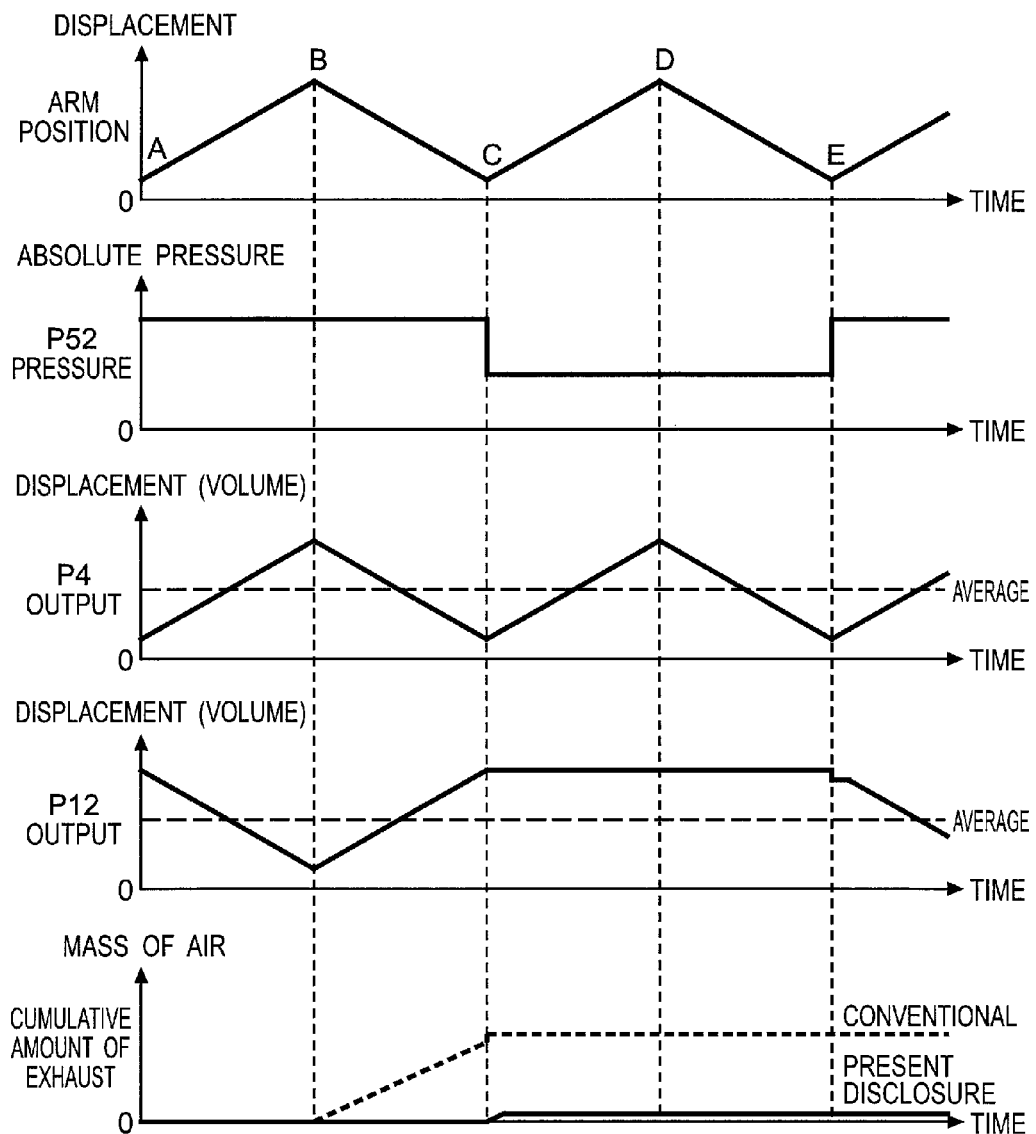

GAS-PRESSURE TYPE GRAVITY COMPENSATION ELEVATOR

CROSS-REFERENCE TO RELATED APPLICATIONS

This is a continuation application of International Application No. PCT/JP2012/006481, with an international filing date of Oct. 10, 2012, which claims priority of Japanese Patent Application No. 2011-239193 filed on Oct. 31, 2011, the content of which is incorporated herein by reference.

TECHNICAL FIELD

The technical field relates to gas-pressure type gravity compensation elevators which are adapted to balance the weights of load objects using gas cylinders for facilitating ascents and descents of the load objects and, further, are adapted to reduce the amounts of compressed gas sucked and exhausted during ascending/descending operations for reducing the energy consumption.

BACKGROUND ART

There have been known gravity compensation elevators using gas pressures, which are adapted to generate a vertical force balanced with the gravity acting on a load object, using a gas cylinder, for enabling ascending and descending the object with a weight, with the same feeling as that in a non-gravity environment in order to facilitate loading operations of the object with the weight. As such gravity compensation elevators, there have been known arm-type elevators, hoist-type elevators, and the like. Such arm-type elevators are adapted to vertically support an arm movable in a horizontal direction with a gas cylinder and, further, are adapted to balance the weight of a load object being grasped by the tip end of the arm, with the force generated from the gas cylinder. Such hoist-type elevators are adapted to convert the force generated from a gas cylinder held movably in a horizontal direction, into a rotational torque, using ball screws and the like, and, further, are adapted to utilize it as a force for winding up a wire for balancing the weight of a load object therewith (refer to Patent Literature 1 and Patent Literature 2, for example).

CITATION LIST

Patent Literature

Patent Literature 1: Japanese Patent No. 3794743
Patent Literature 2: JP-A No. 2010-111464

SUMMARY OF THE INVENTION

Since these gravity compensation elevators using gas cylinders are adapted to balance the weight of a load object, through the pressure of compressed gas charged in the gas cylinder, they have the advantage of easily addressing the presence or absence of load objects or differences theeramong, by changing the pressure of the compressed gas. On the other hand, every time the internal volume of the gas cylinder has changed along with ascending/descending operations, it is necessary to flow compressed gas into and from the gas cylinder for adjusting the pressure thereof. In cases of ascending a load object, it is necessary to supply compressed gas thereto from the outside. In cases of descending a load object, it is necessary to exhaust compressed gas therefrom to the outside. Therefore, as operations for ascending and descending load objects are repeated, the amount of supplied and exhausted compressed gas is increased. Accordingly, in cases of performing operations for ascending a load object once and, thereafter, descending the load object to the original height, with a conventional gravity compensation elevator, the compressed gas having been supplied thereto during the ascending should be exhausted during the descending. This has involved suction and exhaust of the compressed gas, even though there is no total energy consumption in view of the potential energy. This has induced the problem of the occurrence of wasteful energy consumption.

One non-limiting and exemplary embodiment provides a gas-pressure type gravity compensation elevator using a gas cylinder for ascending and descending load objects and, further, being capable of reducing the amount of compressed gas sucked and exhausted during ascending/descending operations, thereby reducing the energy consumption.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: a gas-pressure type gravity compensation elevator comprising:

an elevating mechanism adapted to grasp and ascend/descend a load object;

a grasping-state detection portion adapted to detect a load-object grasping state of the elevating mechanism;

a gas cylinder adapted to exert a driving force in a direction of ascent, on the elevating mechanism;

a first constant-pressure gas cylinder which is pressed by a first constant-load generating portion and is capable of exhibiting a volume change equal to or more than a volume change in the gas cylinder, such that the gas cylinder maintains a pressure which generates a driving force balanced with a weight of the elevating mechanism and a weight of the load object being grasped by the elevating mechanism;

a first connection valve adapted to open and close a connection pipe which connects the first constant-pressure gas cylinder and the gas cylinder to each other;

a first volume estimation part adapted to estimate, as an estimated value, a sum of a volume in the gas cylinder and a volume in the first constant-pressure gas cylinder;

a second constant-pressure gas cylinder which is pressed by a second constant-load generating portion and is capable of exhibiting a volume change equal to or more than the volume change in the gas cylinder, such that the gas cylinder maintains a pressure which generates a driving force balanced with the weight of the elevating mechanism;

a second connection valve adapted to open and close a connection pipe which connects the second constant-pressure gas cylinder and the gas cylinder to each other;

a second volume estimation part adapted to estimate, as an estimated value, a sum of the volume in the gas cylinder and a volume in the second constant-pressure gas cylinder;

a gas supply portion adapted to supply a gas at a pressure exceeding a pressure in the first constant-pressure gas cylinder;

a gas exhaust portion adapted to exhaust a gas within the second constant-pressure gas cylinder;

a changeover valve portion adapted to perform a changeover among a state where the gas cylinder is connected to the gas supply portion, a state where the gas cylinder is connected to the gas exhaust portion, and a state where the gas cylinder is interrupted from both the gas supply portion and the gas exhaust portion; and an amount-of-gas control part which is adapted to operate the first connection valve, the second connection valve, and the changeover valve portion for controlling the estimated value from the first volume estimation part such that the estimated value from the first volume estimation part equals to a sum of an average volume of the gas cylinder and an average volume of the first constant-pressure gas cylinder or for controlling the estimated value from the second volume estimation part such that the estimated value from the second volume estimation part equals to a sum of the average volume of the gas cylinder and an average volume of the second constant-pressure gas cylinder, every time the load-object grasping state from the grasping-state detection portion is changed.

These general and specific aspects may be implemented using a system, a method, and any combination of systems and methods.

In the aforementioned aspect of the present invention, the gas cylinder is connected to the first constant-pressure gas cylinder in states where the elevating mechanism is grasping a load object, and the gas cylinder is connected to the second constant-pressure gas cylinder in states where the elevating mechanism is grasping no load object, thereby obtaining a gravity compensation effect. Even when the elevating mechanism is further moved upwardly or downwardly, gas is moved only between the gas cylinder and the first constant-pressure gas cylinder or the second constant-pressure gas cylinder and, thus, there is induced no inflow and no outflow of compressed gas from and to the outside. Every time the load-object grasping state of the elevating mechanism has changed, the destination of the connection of the gas cylinder is changed over between the first constant-pressure gas cylinder and the second constant-pressure gas cylinder, which changes the pressure in the gas cylinder and, also, changes the amount of the gas at a pressure equal to the pressure in the first constant-pressure gas cylinder and the amount of the gas at a pressure equal to the pressure in the second constant-pressure gas cylinder. However, every time the gas cylinder has been connected to the first constant-pressure gas cylinder, the changeover valve portion is operated to control the sum of the volume in the gas cylinder and the volume in the first constant-pressure gas cylinder such that the sum is equal to the sum of their respective average volumes. Further, every time the gas cylinder has been connected to the second constant-pressure gas cylinder, the changeover valve portion is operated to control the sum of the volume in the gas cylinder and the volume in the second constant-pressure gas cylinder such that the sum is equal to the sum of their respective average volumes. This enables performing successive operations only by sucking and exhausting compressed gas corresponding to the changes of the pressure in the gas cylinder at the time of the changeovers of the pressure in the gas cylinder, regardless of the halfway movements of the elevating mechanism in the upward and downward directions. This enables efficient utilization of the energy of the compressed gas. This can reduce the amount of compressed gas sucked and exhausted during repetitions of ascending/descending operations, thereby reducing the energy consumption.

BRIEF DESCRIPTION OF THE DRAWINGS

These and other aspects and features of the present disclosure will become clear from the following description taken in conjunction with the embodiments thereof with reference to the accompanying drawings, in which:

FIG. 5 is a flow chart of volume control by a controller, according to the second embodiment of the present invention; and FIG. 6 is a view illustrating a cumulative amount of exhaust in an example of operations of the gas-pressure type gravity compensation elevator, when the volume control by the controller is performed according to the second embodiment of the present invention (present disclosure), in comparison with conventional one.

DETAILED DESCRIPTION

Figure 1:
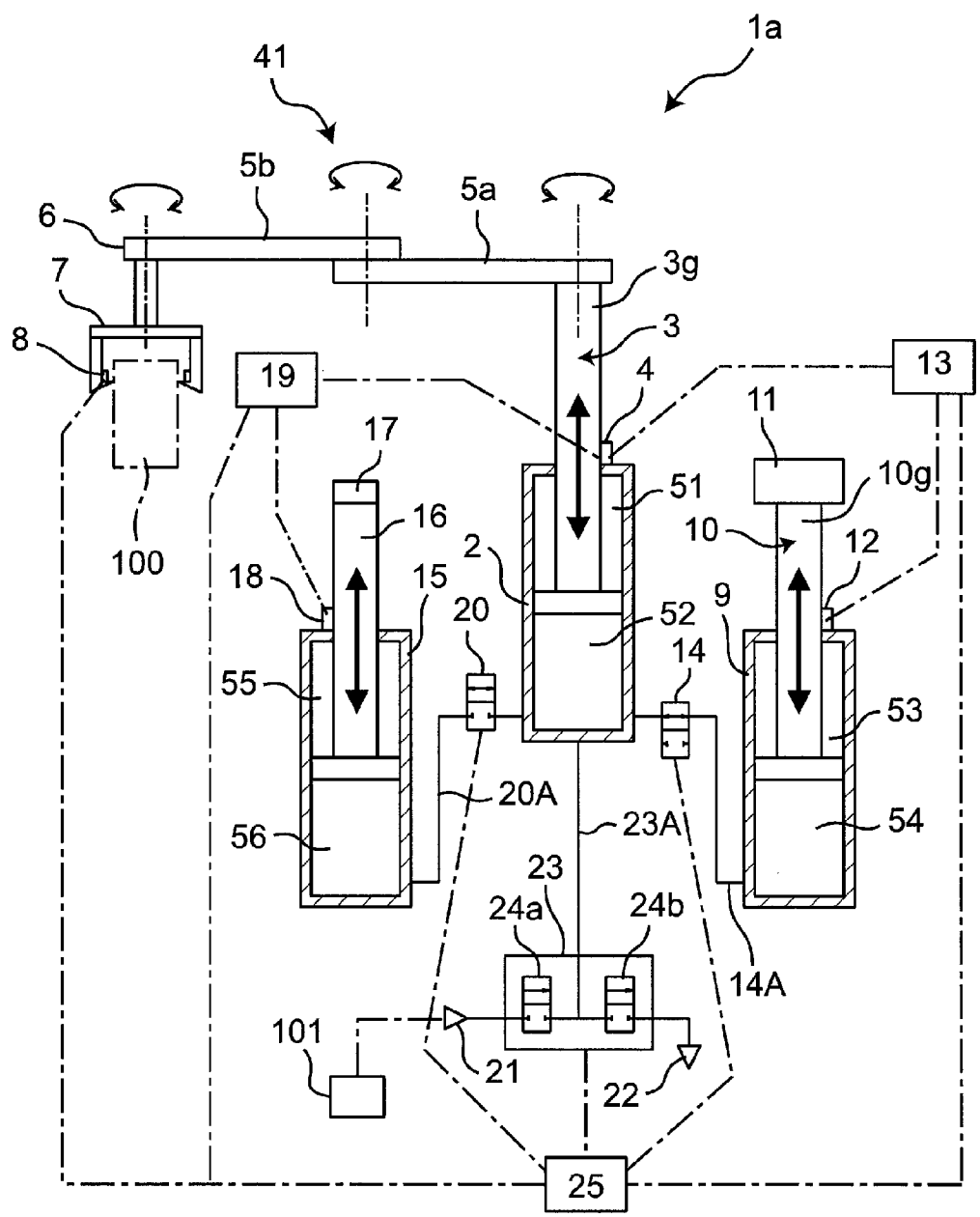
FIG. 1 is a view illustrating the general outline of a gas-pressure type gravity compensation elevator according to a first embodiment of the present invention.

Hereinafter, embodiments of the present invention will be described, in detail, with reference to the drawings.

Before the description of the embodiments of the present invention, various aspects of the present invention will be described.

1st aspect: A gas-pressure type gravity compensation elevator comprising:

an elevating mechanism adapted to grasp and ascend/descend a load object;

a grasping-state detection portion adapted to detect a load-object grasping state of the elevating mechanism;

a gas cylinder adapted to exert a driving force in a direction of ascent, on the elevating mechanism;

a first constant-pressure gas cylinder which is pressed by a first constant-load generating portion and is capable of exhibiting a volume change equal to or more than a volume change in the gas cylinder, such that the gas cylinder maintains a pressure which generates a driving force balanced with a weight of the elevating mechanism and a weight of the load object being grasped by the elevating mechanism;

a first connection valve adapted to open and close a connection pipe which connects the first constant-pressure gas cylinder and the gas cylinder to each other;

a first volume estimation part adapted to estimate, as an estimated value, a sum of a volume in the gas cylinder and a volume in the first constant-pressure gas cylinder;

a second constant-pressure gas cylinder which is pressed by a second constant-load generating portion and is capable of exhibiting a volume change equal to or more than the volume change in the gas cylinder, such that the gas cylinder maintains a pressure which generates a driving force balanced with the weight of the elevating mechanism;

a second connection valve adapted to open and close a connection pipe which connects the second constant-pressure gas cylinder and the gas cylinder to each other;

a second volume estimation part adapted to estimate, as an estimated value, a sum of the volume in the gas cylinder and a volume in the second constant-pressure gas cylinder;

a gas supply portion adapted to supply a gas at a pressure exceeding a pressure in the first constant-pressure gas cylinder;

a gas exhaust portion adapted to exhaust a gas within the second constant-pressure gas cylinder;

a changeover valve portion adapted to perform a changeover among a state where the gas cylinder is connected to the gas supply portion, a state where the gas cylinder is connected to the gas exhaust portion, and a state where the gas cylinder is interrupted from both the gas supply portion and the gas exhaust portion; and an amount-of-gas control part which is adapted to operate the first connection valve, the second connection valve, and the changeover valve portion for controlling the estimated value from the first volume estimation part such that the estimated value from the first volume estimation part equals to a sum of an average volume of the gas cylinder and an average volume of the first constant-pressure gas cylinder or for controlling the estimated value from the second volume estimation part such that the estimated value from the second volume estimation part equals to a sum of the average volume of the gas cylinder and an average volume of the second constant-pressure gas cylinder, every time the load-object grasping state from the grasping-state detection portion is changed.

With this structure, the gas cylinder is connected to the first constant-pressure gas cylinder in states where the elevating mechanism is grasping a load object, and the gas cylinder is connected to the second constant-pressure gas cylinder in states where the elevating mechanism is grasping no load object, thereby obtaining a gravity compensation effect. Even when the elevating mechanism is further moved upwardly or downwardly, gas is moved only between the gas cylinder and the first constant-pressure gas cylinder or the second constant-pressure gas cylinder and, thus, there is induced no inflow and no outflow of compressed gas from and to the outside. Every time the load-object grasping state of the elevating mechanism has changed, the destination of the connection of the gas cylinder is changed over between the first constant-pressure gas cylinder and the second constant-pressure gas cylinder, which changes the pressure in the gas cylinder and, also, changes the amount of the gas at a pressure equal to the pressure in the first constant-pressure gas cylinder and the amount of the gas at a pressure equal to the pressure in the second constant-pressure gas cylinder. However, every time the gas cylinder has been connected to the first constant-pressure gas cylinder, the amount-of-gas control part operates the changeover valve portion for controlling the sum of the volume in the gas cylinder and the volume in the first constant-pressure gas cylinder such that the sum is equal to the sum of their respective average volumes. Further, every time the gas cylinder has been connected to the second constant-pressure gas cylinder, the amount-of-gas control part operates the changeover valve portion for controlling the sum of the volume in the gas cylinder and the volume in the second constant-pressure gas cylinder such that the sum is equal to the sum of their respective average volumes. This enables performing successive operations only by sucking and exhausting compressed gas corresponding to the changes of the pressure in the gas cylinder at the time of the changeovers of the pressure in the gas cylinder, regardless of the halfway movements of the elevating mechanism in the upward and downward directions. This enables efficient utilization of the energy of the compressed gas. This can reduce the amount of compressed gas sucked and exhausted during repetitions of ascending/descending operations, thereby reducing the energy consumption.

2nd aspect: The gas-pressure type gravity compensation elevator according to the 1st aspect, wherein the amount-of-gas control part is adapted to connect only one of the gas supply portion and the gas exhaust portion, to the gas cylinder, in operating the changeover valve portion, every time the load-object grasping state from the grasping-state detection portion is changed.

With this structure, in performing the volume control with the amount-of-gas control part, it is possible to eliminate the necessity of wastefully exhausting the compressed air having been sucked into the gas cylinder once or wastefully sucking, again, compressed air equivalent to the exhaust from the gas cylinder. This can further reduce the energy consumption. Accordingly, it is possible to provide a gravity compensation elevator which involves less energy consumption during ascending/descending operations.

3rd aspect: The gas-pressure type gravity compensation elevator according to the 1st or 2nd aspect, wherein the second volume estimation part is adapted to estimate a volume sum, as the estimated value, using a displacement of the gas cylinder and a displacement of the second constant-pressure gas cylinder.

With this structure, it is possible to provide, with simple means, information about the estimated volume sum necessary for the volume control by the amount-of-gas control part.

4th aspect: A gas-pressure type gravity compensation elevator comprising:

an elevating mechanism adapted to grasp and ascend/descend a load object;

a grasping-state detection portion adapted to detect a load-object grasping state of the elevating mechanism;

a gas cylinder adapted to exert a driving force in a direction of ascent, on the elevating mechanism;

a self-weighting compensation portion adapted to compensate for a weight of the elevating mechanism;

a first constant-pressure gas cylinder which is pressed by a first constant-load generating portion and is capable of exhibiting a volume change equal to or more than a volume change in the gas cylinder, such that the gas cylinder maintains a pressure which generates a driving force balanced with a weight of the load object being grasped by the elevating mechanism;

a first connection valve adapted to open and close a connection pipe which connects the first constant-pressure gas cylinder and the gas cylinder to each other;

a first volume estimation part adapted to estimate, as an estimated value, a sum of a volume in the gas cylinder and a volume in the first constant-pressure gas cylinder;

a second connection valve adapted to open and close a connection pipe which connects the gas cylinder and an ambient atmosphere to each other;

a gas supply portion adapted to supply a gas at a pressure exceeding a pressure in the first constant-pressure gas cylinder;

a changeover valve portion adapted to perform a changeover among a state where the gas cylinder is connected to the gas supply portion, a state where the gas cylinder is connected to the ambient atmosphere, and a state where the gas cylinder is interrupted from both the gas supply portion and the ambient atmosphere; and an amount-of-gas control part which is adapted to operate the first connection valve, the second connection valve, and the changeover valve portion for controlling the estimated value from the first volume estimation part such that the estimated value from the first volume estimation part equals to a sum of an average volume of the gas cylinder and an average volume of the first constant-pressure gas cylinder or for connecting the gas cylinder to the ambient atmosphere, every time the load-object grasping state from the grasping-state detection portion is changed.

With this structure, the gas cylinder is connected to the first constant-pressure gas cylinder in states where the elevating mechanism is grasping a load object, and the gas cylinder is connected to the ambient atmosphere in states where the elevating mechanism is grasping no load object, thereby obtaining a gravity compensation effect. Even when the elevating mechanism is further moved upwardly or downwardly, compressed gas is moved only between the gas cylinder and the first constant-pressure gas cylinder and, thus, there is induced no inflow and no outflow of compressed gas from and to the outside. Every time the load-object grasping state of the elevating mechanism has changed, the destination of the connection of the gas cylinder is changed over between the first constant-pressure gas cylinder and the ambient atmosphere, which changes the pressure in the gas cylinder and, also, changes the amount of the gas at a pressure equal to the pressure in the first constant-pressure gas cylinder. However, every time the gas cylinder has been connected to the first constant-pressure gas cylinder, the amount-of-gas control part operates the changeover valve portion for controlling the sum of the volume in the gas cylinder and the volume in the first constant-pressure gas cylinder such that the sum is equal to the sum of their respective average volumes. This enables performing successive operations only by sucking and exhausting compressed gas corresponding to the changes of the pressure in the gas cylinder at the time of the changeovers of the pressure in the gas cylinder, regardless of the halfway movements of the elevating mechanism in the upward and downward directions. This enables efficient utilization of the energy of the compressed gas. This can reduce the amount of compressed gas sucked and exhausted during repetitions of ascending/descending operations, thereby reducing the energy consumption.

5th aspect: The gas-pressure type gravity compensation elevator according to the 4th aspect, wherein the amount-of-gas control part is adapted to connect only one of the gas supply portion and the ambient atmosphere, to the gas cylinder, in operating the changeover valve portion, every time the load-object grasping state from the grasping-state detection portion is changed.

With this structure, in performing the volume control with the amount-of-gas control part, it is possible to eliminate the necessity of wastefully exhausting the compressed air having been sucked into the gas cylinder once or wastefully sucking, again, compressed air equivalent to the exhaust from the gas cylinder. This can further reduce the energy consumption. Accordingly, it is possible to provide a gravity compensation elevator which involves less energy consumption during ascending/descending operations.

6th aspect: The gas-pressure type gravity compensation elevator according to any one of the 1st to 5th aspects, wherein the first volume estimation part is adapted to estimate a volume sum, as the estimated value, using a displacement of the gas cylinder and a displacement of the first constant-pressure gas cylinder.

With this structure, it is possible to provide, with simple means, information about the estimated volume sum necessary for the volume control by the amount-of-gas control part.

7th aspect: The gas-pressure type gravity compensation elevator according to any one of the 1st to 6th aspects, comprising:

a plurality of combinations of the first constant-load generating portion, the first constant-pressure gas cylinder, the first connection valve, and the first volume estimation part, correspondingly to the respective weights of different load objects, and a load-object identification portion adapted to distinguish plural load objects from each other, the load-object identification portion being provided in the grasping-state detection portion, wherein the amount-of-gas control part is adapted to select a to-be-used combination of the first constant-load generating portion, the first constant-pressure gas cylinder, the first connection valve, and the first volume estimation part, according to the grasped load object which is decided by the grasping-state detection portion and the load-object identification portion.

With this structure, even when ascending/descending operations are repeated while changeovers are performed among load objects of different types (with different weights), it is possible to reduce the amount of sucked and exhausted compressed gas, thereby reducing the energy consumption.

8th aspect: The gas-pressure type gravity compensation elevator according to the 7th aspect, comprising gas supply portions corresponding to respective pressures in the first constant-pressure gas cylinders, for the respective combinations of the first constant-load generating portion, the first constant-pressure gas cylinder, the first connection valve, and the first volume estimation part, and the changeover valve portion is adapted to select a gas supply portion to be used, according to the grasped load object which is decided by the grasping-state detection portion and the load-object identification portion.

With this structure, it is possible to select a gas supply portion having a small differential pressure with respect to the pressure in each first constant-pressure gas cylinder, which can reduce the energy consumption necessary for the fabrication of the compressed gas in the gas supply portion.

Hereinafter, the gas-pressure type gravity compensation elevators according to the embodiments of the present invention will be described, with reference to the drawings.

First Embodiment

FIG. 1 illustrates the general outline of a gas-pressure type gravity compensation elevator 1*a*, according to a first embodiment of the present invention. In this case, it is assumed that the gas-pressure type gravity compensation elevator 1*a* is used for repeatedly ascending and descending load objects 100 having the same weight.

The gas-pressure type gravity compensation elevator 1a in FIG. 1 is structured to include an elevating mechanism, a grasping-state detection portion, a gas cylinder, a first constant-pressure gas cylinder, a first connection valve, a first volume estimation part, a second constant-pressure gas cylinder, a second connection valve, a second volume estimation part, a gas supply portion, a gas exhaust portion, a changeover valve portion, and an amount-of-gas control part. Hereinafter, these devices or members will be described, in detail.

In the gas-pressure type gravity compensation elevator 1*a*, a piston 3 is provided such that the piston 3 can move upwardly and downwardly, in an air cylinder 2 as an example of the gas cylinder. A space 51 (an upper space) which is enclosed by the piston 3 and the upper portion of the air cylinder 2 is opened to the atmosphere and, therefore, is kept under the atmospheric pressure. The displacement of the piston 3 is measured by a linear encoder 4 placed at an upper end of the air cylinder 2. An arm 41 as an example of the elevating mechanism is constituted by two revolving arms 5*a* and 5*b*, a shaft 6, and a grasping hand 7. The first revolving arm 5a is coupled, at one end thereof, to the upper end portion of a piston rod 3g in the piston 3 such that the first revolving arm 5a can rotate about a vertical axis. The second revolving arm 5b is coupled, at one end thereof, to another end of the first revolving arm 5a such that the second revolving arm 5b can rotate about a vertical axis. The shaft 6 is coupled, at its upper end, to another end of the second revolving arm 5b, such that the shaft 6 can rotate about a vertical axis. The grasping hand 7 is secured to the tip end (the lower end) of the shaft 6. The grasping hand 7 is provided with a contact sensor(s) 8 as an example of the grasping-state detection portion. Accordingly, the entire arm 41 is enabled to ascend and descend along with the upward and downward movements of the piston 3 and, also, the grasping hand 7 at the tip end of the arm 41 is enabled to move in a horizontal plane, which enables performing loading operations by causing the grasping hand 7 to grasp the load object 100. Namely, in the horizontal direction, a loading operator can arbitrarily revolve the first and second revolving arms 5a and 5b and the shaft 6 about the respective vertical axes, by pressing the arm 41 in a desired direction.

A piston 10 is provided such that the piston 10 can move upwardly and downwardly, in a first constant-pressure air cylinder 9 as an example of the first constant-pressure gas cylinder. A space 53 (an upper space) which is enclosed by the piston 10 and the upper portion of the first constant-pressure air cylinder 9 is opened to the atmosphere and, therefore, is kept under the atmospheric pressure. A weight member 11 as an example of a first constant-load generating portion is secured to the upper portion of the piston 10 (namely, the upper end of a piston rod 10g). The displacement of the piston 10 is measured by a linear encoder 12 placed at the upper end of the first constant-pressure air cylinder 9. The respective outputs from the linear encoder 4 and the linear encoder 12 are inputted to a volume-sum calculator 13 as an example of the first volume estimation part, which calculates the sum of the volume of the air room 52 enclosed by the air cylinder 2 and the piston 3 (the lower space enclosed by the piston 3 and the lower portion of the air cylinder 2) and the volume of the air room 54 enclosed by the piston 10 and the lower portion of the first constant-pressure air cylinder 9 (the lower space enclosed by the piston 10 and the lower portion of the first constant-pressure the air cylinder 9). The calculated volume of each of the air rooms is determined, from the product of the cross-sectional area and the length of the air room 52 or 54, by utilizing the fact that the air cylinder 2 and the first constant-pressure air cylinder 9 have constant cross-sectional areas, regardless of the positions of the pistons 3 and 10. The air room 52 and the air room 54 are connected to each other, through a connection pipe 14A via a first ON/OFF valve 14 as an example of the first connection valve. The first constant-pressure air cylinder 9 has such a size that the change of the volume of the air room 54 (the maximum volume minus the minimum volume) is equal to or more than the change of the volume of the air room 52 (for example, 1.2 times). As the size of the first constant-pressure air cylinder 9 is increased, it has higher resistance to errors or volume changes at the time of changeovers of the ON/OFF valve during volume control, which will be described later, but the entire size is increased. Therefore, for example, the first constant-pressure air cylinder 9 may have such a size that the change of the volume of the air room 54 is 1.1 to 1.3 times the change of the volume of the air room 52. The weight member 11 is made to have the weight determined by dividing the sum of the weights of the arm 41, the piston 3 and the estimated load object 100 by the cross-sectional area of the air cylinder 2, further multiplying the result of the division by the cross-sectional area of the first constant-pressure air cylinder 9 and, further, subtracting the weight of the piston 10 from the value resulted from the multiplication. By doing this, when the pressure in the air room 52 is equal to the pressure in the air room 54, the arm 41 grasping the load object 100 is brought into a vertically-balanced state, which enables easily performing ascending/descending operations therewith. However, it is not preferable, in view of safety, that ascending/descending operations with the arm 41 are performed at higher speeds. Therefore, for example, the air cylinder 2 may be prevented from being operated at higher speeds, through the flow-path resistance in the first ON/OFF valve 14. If necessary, it is possible to add a throttle or an excessive-flow-rate shut-off valve to the first ON/OFF valve 14, in order to further improve the safety.

A piston 16 is provided such that the piston 16 can move upwardly and downwardly, in a second constant-pressure air cylinder 15 as an example of the second constant-pressure gas cylinder. A space (an upper space) 55 which is enclosed by the piston 16 and the second constant-pressure air cylinder 15 is opened to the atmosphere and, therefore, is kept under the atmospheric pressure. A weight member 17 as an example of a second constant-load generating portion is secured to an upper portion of the piston 16. The displacement of the piston 16 is measured by a linear encoder 18 placed at the upper end of the second constant-pressure air cylinder 15. The respective outputs from the linear encoder 4 and the linear encoder 18 are inputted to a volume-sum calculator portion 19 as an example of the second volume estimation part, which calculates the sum of the volume of the air room 52 enclosed by the air cylinder 2 and the piston 3 (the lower space enclosed by the piston 3 and the lower portion of the air cylinder 2) and the volume of the air room 56 enclosed by the piston 16 and the lower portion of the second constant-pressure air cylinder 15 (the lower space enclosed by the piston 16 and the lower portion of the second constant-pressure the air cylinder 15). The calculated volume of each of the air rooms is determined, from the product of the cross-sectional area and the length of the air room 52 or 56, by utilizing the fact that the air cylinder 2 and the second constant-pressure air cylinder 15 have constant cross-sectional areas, regardless of the positions of the pistons 3 and 16. The air room 52 and the air room 56 are connected to each other, through a connection pipe 20A via a second ON/OFF valve 20 as an example of the second connection valve. The second constant-pressure air cylinder 15 has such a size that the change of the volume of the air room 56 is equal to or more than the change of the volume of the air room 52 (for example, 1.2 times). As the size of the second constant-pressure air cylinder 15 is increased, it has higher resistance to errors or volume changes at the time of changeovers of the ON/OFF valve during volume control, which will be described later, but the entire size is increased. Therefore, for example, the second constant-pressure air cylinder 15 may have such a size that the change of the volume of the air room 56 is 1.1 to 1.3 times the change of the volume of the air room 52. The weight member 17 is made to have the weight determined by dividing the sum of the weights of the arm 41 and the piston 3 by the cross-sectional area of the air cylinder 2, further multiplying the result of the division by the cross-sectional area of the second constant-pressure air cylinder 15 and, further, subtracting the weight of the piston 16 from the value resulted from the multiplication. By doing this, when the pressure in the air room 52 is equal to the pressure in the air room 56, the arm 41 grasping no load object 100 is brought into a vertically-balanced state, which enables easily performing ascending/descending operations therewith. However, it is not preferable, in view of safety, that ascending/descending operations with the arm 41 are performed at higher speeds. Therefore, for example, the air cylinder 2 may be prevented from being operated at higher speeds, through the flow-path resistance in the second ON/OFF valve 20. If necessary, it is possible to add a throttle or an excessive-flow-rate shut-off valve to the second ON/OFF valve 20, in order to further improve the safety.

A valve unit 23 as an example of the changeover valve portion is placed such that the valve unit 23 can be connected to the air room 52 in the air cylinder 2 through a connection pipe 23A and, further, is constituted by third and fourth ON/OFF valves 24*a* and 24*b*. The third ON/OFF valve 24*a* changes the state of the connection between the air room 52 and a compressed-air supply port 21 as an example of the gas supply portion which is connected to a high-pressure source 101, for example. Through the compressed-air supply port 21, compressed air at a pressure exceeding the pressure in the air room 54 is supplied. The fourth ON/OFF valve 24*b* changes the state of the connection between the air room 52 and an air releasing port 22 as an example of the gas exhaust portion or a low-pressure source, for example. A controller 25 as an example of the amount-of-gas control part controls the operations of the first ON/OFF valve 14, the second ON/OFF valve 20, and the valve unit 23, independently of each other, while obtaining information about the contact sensor(s) 8, the volume-sum calculator 13, and the volume-sum calculator portion 19. If the third ON/OFF valve 24*a* is opened, compressed air flows into the air room 52 through the compressed-air supply port 21. If the fourth ON/OFF valve 24*b* is opened, compressed air flows out from the air room 52 to the air releasing port 22.

Figure 2:
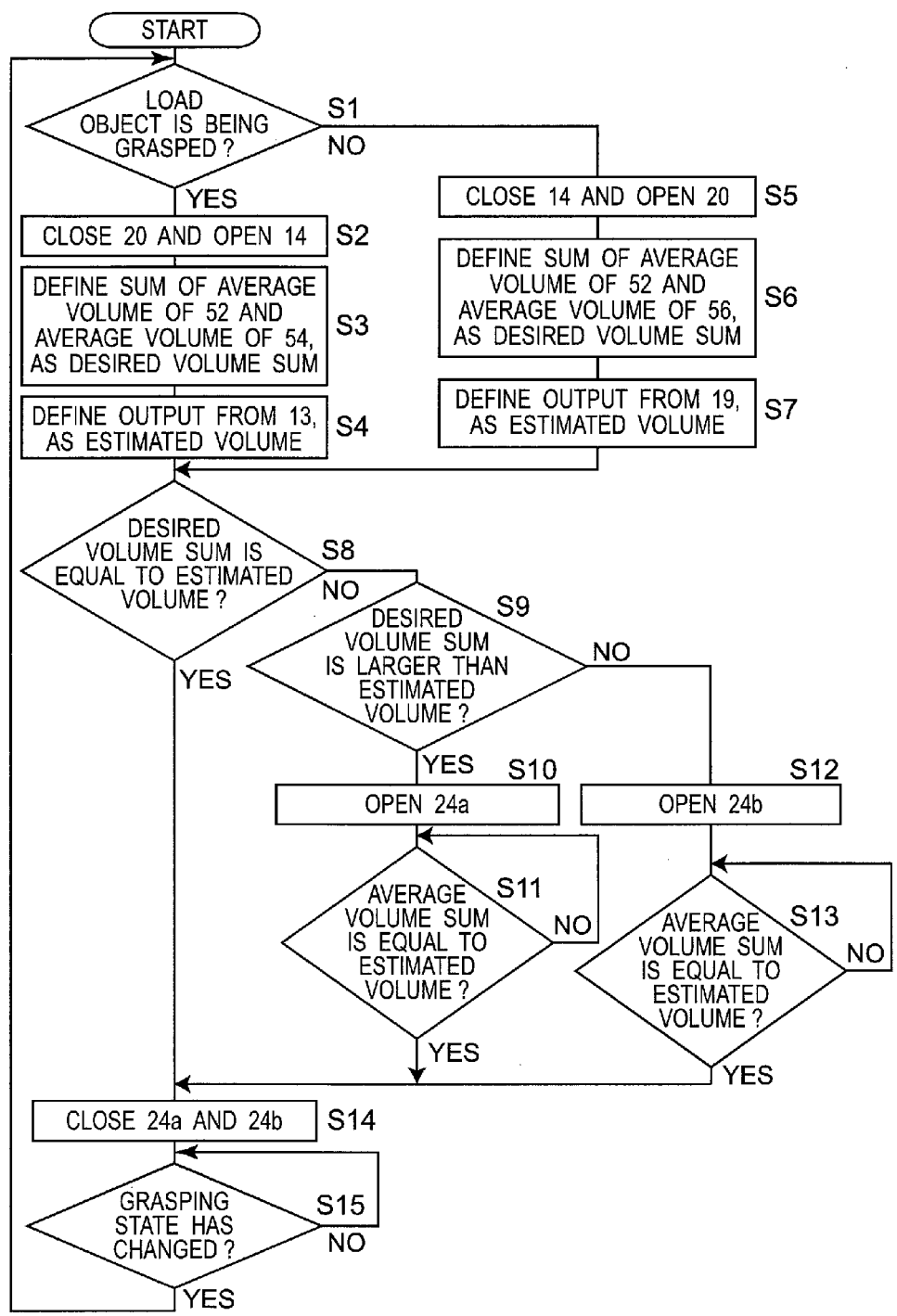
FIG. 2 is a flow chart of volume control by a controller, according to the first embodiment of the present invention.

Next, there will be described actions of the gas-pressure type gravity compensation elevator 1*a*, which are performed under the control of the controller 25. FIG. 2 is a flow chart of volume control by the controller 25.

At first, the controller 25 determines whether or not the grasping hand 7 is grasping a load object 100, based on the output from the contact sensor(s) 8 (Step S1 in FIG. 2).

If the controller 25 determines, in the step S1, that the grasping hand 7 is grasping the load object 100, the controller 25 closes the second ON/OFF valve 20 and opens the first ON/OFF valve 14 in a step S2. As a result thereof, the air room 52 and the air room 54 are connected to each other. In closing the second ON/OFF value 20 and opening the first ON/OFF valve 14, for example, the first ON/OFF valve 14 may be opened after the second ON/OFF valve 20 is closed, in order to prevent the occurrence of wasteful air flows from the air room 54 to the air room 56. The pressures in the air room 52 and the air room 54 are made equal to each other, which realizes gravity compensation in the state where the grasping hand 7 is grasping the load object 100.

Next, the controller 25 defines the desired volume sum for the control, as the sum of the average volume of the air room 52 and the average volume of the air room 54 (step S3 in FIG. 2). The average volume of the air room 52 refers to the average of the maximum volume and the minimum volume of the air room 52 when the piston 3 moves upwardly and downwardly. The average volume of the air room 54 refers to the average of the maximum volume and the minimum volume of the air room 54 when the piston 10 moves upwardly and downwardly. Further, the controller 25 defines an estimated volume to be controlled, as the output from the volume-sum calculator 13 (step S4 in FIG. 2). Thereafter, the control proceeds to a step S8.

On the other hand, if the controller 25 determines, in the step S1, that the grasping hand 7 is grasping no load object 100, the controller 25 closes the first ON/OFF valve 14 and opens the second ON/OFF valve 20, in a step S5. As a result thereof, the air room 52 and the air room 56 are connected to each other. In closing the first ON/OFF value 14 and opening the second ON/OFF valve 20, for example, the second ON/OFF valve 20 may be opened after the first ON/OFF valve 14 is closed, in order to prevent the occurrence of wasteful air flows from the air room 54 to the air room 56. The pressures in the air room 52 and the air room 56 are made equal to each other, which realizes gravity compensation in the state where the grasping hand 7 is grasping no load object 100.

Next, the controller 25 defines the desired volume sum for the control, as the sum of the average volume of the air room 52 and the average volume of the air room 56 (step S6 in FIG. 2). The average volume of the air room 56 refers to the average of the maximum volume and the minimum volume of the air room 56 when the piston 16 moves upwardly and downwardly. Further, the controller 25 defines an estimated volume to be controlled, as the output from the volume-sum calculator portion 19 (step S7 in FIG. 2). Thereafter, the control proceeds to the step S8.

In the step S8, the controller 25 makes a comparison between the desired volume sum and the estimated volume. If the controller 25 determines that the estimated volume agrees with the desired volume sum, the control proceeds to a step S14. If the controller 25 determines that the estimated volume does not agree with the desired volume sum, the control proceeds to a step S9. It is not indispensable that the agreement between the estimated volume and the desired volume sum be determined strictly by the controller 25. In taking account of designing or calculation errors, it is possible to regard them as agreeing with each other, if the difference therebetween falls within the range of 5% or less, for example. The same will apply to determinations of agreement, which will be described later.

If the control proceeds to the step S9, the controller 25 determines which of the desired volume sum and the estimated volume is larger than the other. If the controller 25 determines that the desired volume sum has exceeded the estimated volume, the controller 25 opens the third ON/OFF valve 24*a* in the valve unit 23 for connecting the air room 52 to the compressed-air supply port 21, thereby causing compressed air to flow into the air room 52 (step S10 in FIG. 2). Thereafter, this state is continued, until the controller 25 determines that the desired volume sum has gotten to agree with the estimated volume (step S11 in FIG. 2). After the controller 25 determines that they have gotten to agree with each other, the control proceeds to the step S14.

On the other hand, if the controller 25 determines that the desired volume sum has been lowered to below the estimated volume, the controller 25 opens the fourth ON/OFF valve 24*b* in the valve unit 23 for connecting the air room 52 to the air releasing port 22, thereby causing compressed air to flow out from the air room 52 (step S12 in FIG. 2). Thereafter, this state is continued, until the controller 25 determines that the desired volume sum has gotten to agree with the estimated volume (step S13 in FIG. 2). After the controller 25 determines that they have gotten to agree with each other, the control proceeds to the step S14.

As described above, in performing the volume control, the compressed air is sucked or exhausted in a single direction. For example, this is for the following reason. That is, in the event of overshooting beyond the desired value due to noises, temperature changes, or other causes, it is possible to eliminate the necessity of wastefully exhausting, again, the compressed air having been sucked once or wastefully sucking, again, compressed air equivalent to the exhausted compressed air.

In the step S14, the controller 25 closes both the third and fourth ON/OFF valves 24a and 24b in the valve unit 23. Thereafter, this state is continued, until the controller 25 determines that the grasping state has changed, since the output of the contact sensor(s) 8 has been changed (step S15 in FIG. 2). If the controller 25 determines that the grasping state has changed, the control returns to the step S1 where volume control is started, again.

Figure 3:
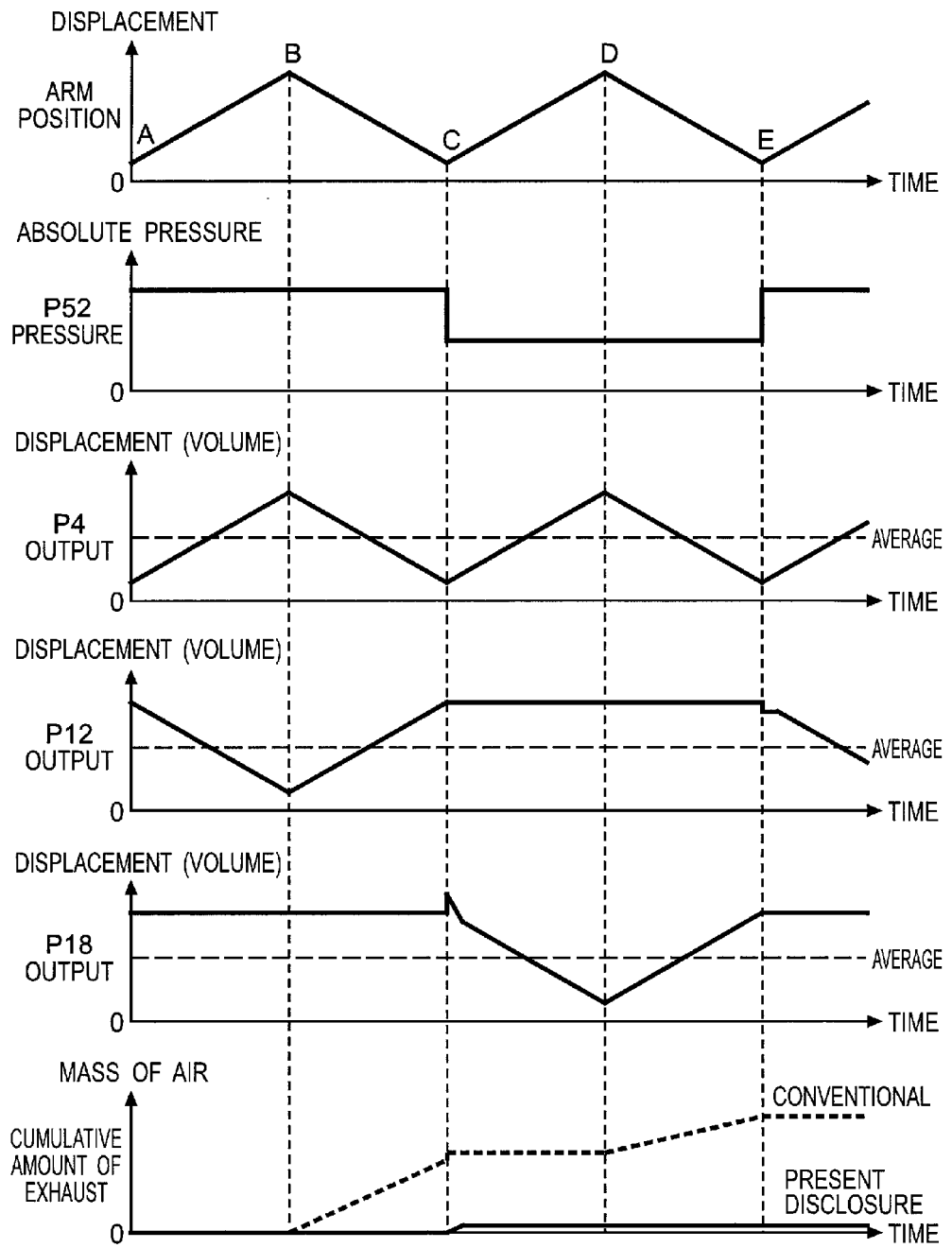
FIG. 3 is a view illustrating a cumulative amount of exhaust in an example of operations of the gas-pressure type gravity compensation elevator, when the volume control by the controller is performed according to the first embodiment of the present invention (present disclosure), in comparison with conventional one.

FIG. 3 illustrates a cumulative amount of exhaust in an example of operations of the gas-pressure type gravity compensation elevator 1a, when the volume control by the controller 25 is performed as described above, in comparison with conventional one.

In FIG. 3, "ARM POSITION" represents the displacement of the arm 41 in the vertical direction.

In FIG. 3, "P52 PRESSURE" represents the pressure in the air room 52. In the example of operations in FIG. 3, an ascending/descending operation is performed by grasping the load object 100 within an A-to-C interval, while an ascending/descending operation is performed with no load object 100 grasped therein within an C-to-E interval. This simulates a state where load objects 100 having the same weight are successively moved, plural times, by the gas-pressure type gravity compensation elevator 1a.

In FIG. 3, "P4 OUTPUT" represents the output from the linear encoder 4, namely the displacement of the piston 3, which changes in conjunction with the arm position. The output from the linear encoder 4 can be converted into the volume, by being multiplied by the cross-sectional area of the air cylinder 2. Therefore, the volume change is changed similarly thereto.

In FIG. 3, "P12 OUTPUT" represents the output from the linear encoder 12, namely the displacement of the piston 10. Within the A-to-C interval, the controller 25 opens the first ON/OFF valve 14, and there is no compressed air coming from and going to the outside and, therefore, the piston 10 descends if the piston 3 ascends, and the piston 10 ascends if the piston 3 descends, which maintains the sum of the volumes in the air room 52 and the air room 54 constant. Within the C-to-E interval, the controller 25 closes the first ON/OFF valve 14, which maintains the volume in the air room 54 constant. At the point E, the controller 25 opens the first ON/OFF valve 14, again and, at this time, air flows into the air room 52 from the air room 54 in order to make the pressure in the air room 52 equal to the pressure in the air room 54, which temporarily reduces the volume in the air room 54, thereby descending the piston 10. Thereafter, the controller 25 opens the third ON/OFF valve 24a and, thus, controls the sum of the volumes in the air room 52 and the air room 54 such that the sum becomes constant. After the point E, the same operations as those within the A-to-C interval can be performed.

In FIG. 3, "P18 OUTPUT" represents the output of the linear encoder 18, namely the displacement of the piston 16. Within the A-to-C interval, the controller 25 closes the second ON/OFF valve 20, which maintains the volume in the air room 56 constant. At the point C, the controller 25 opens the second ON/OFF valve 20 and, at this time, air flows into the air room 56 from the air room 52 in order to make the pressure in the air room 52 equal to the pressure in the air room 56, which temporarily increases the volume in the air room 56, thereby ascending the piston 16. Thereafter, the controller 25 opens the fourth ON/OFF valve 24b and, thus, controls the sum of the volumes in the air room 52 and the air room 56 such that the sum becomes constant. Within the C-to-E interval, the controller 25 opens the second ON/OFF valve 20, and there is no compressed air coming from and going to the outside and, therefore, the piston 16 descends if the piston 3 ascends, and the piston 16 ascends if the piston 3 descends, which maintains the sum of the volumes in the air room 52 and the air room 56 constant. After the point E, the same operations as those within the A-to-C interval are performed.

In comparing the cumulative amount of compressed air exhausted during the aforementioned operations with the conventional one, the compressed air is exhausted only around the point C in the first embodiment of the present invention, while compressed air is continuously exhausted even during the descents of the arm 41 as within the B-to-C or D-to-E interval in cases where the air room 52 is subjected to pressure control as in the conventional manner. This reveals that, by employing the first embodiment of the present invention, it is possible to largely reduce the cumulative amount of exhausted compressed air.

By performing the volume control with the controller 25 as described above, it is possible to provide a gravity compensation effect, regardless of the state of the grasping of load object 100. Further, inflows and outflows of compressed air are occurred only when the grasping state has changed. While inflows and outflows have been conventionally occurred throughout ascending/descending operations, it is possible to prevent the occurrence of such inflows and outflows, which enables efficient utilization of the energy of the compressed gas. This reduces the amount of compressed gas which is sucked and exhausted during repetitions of ascending/descending operations, thereby reducing the energy consumption.

Second Embodiment

Figure 4:
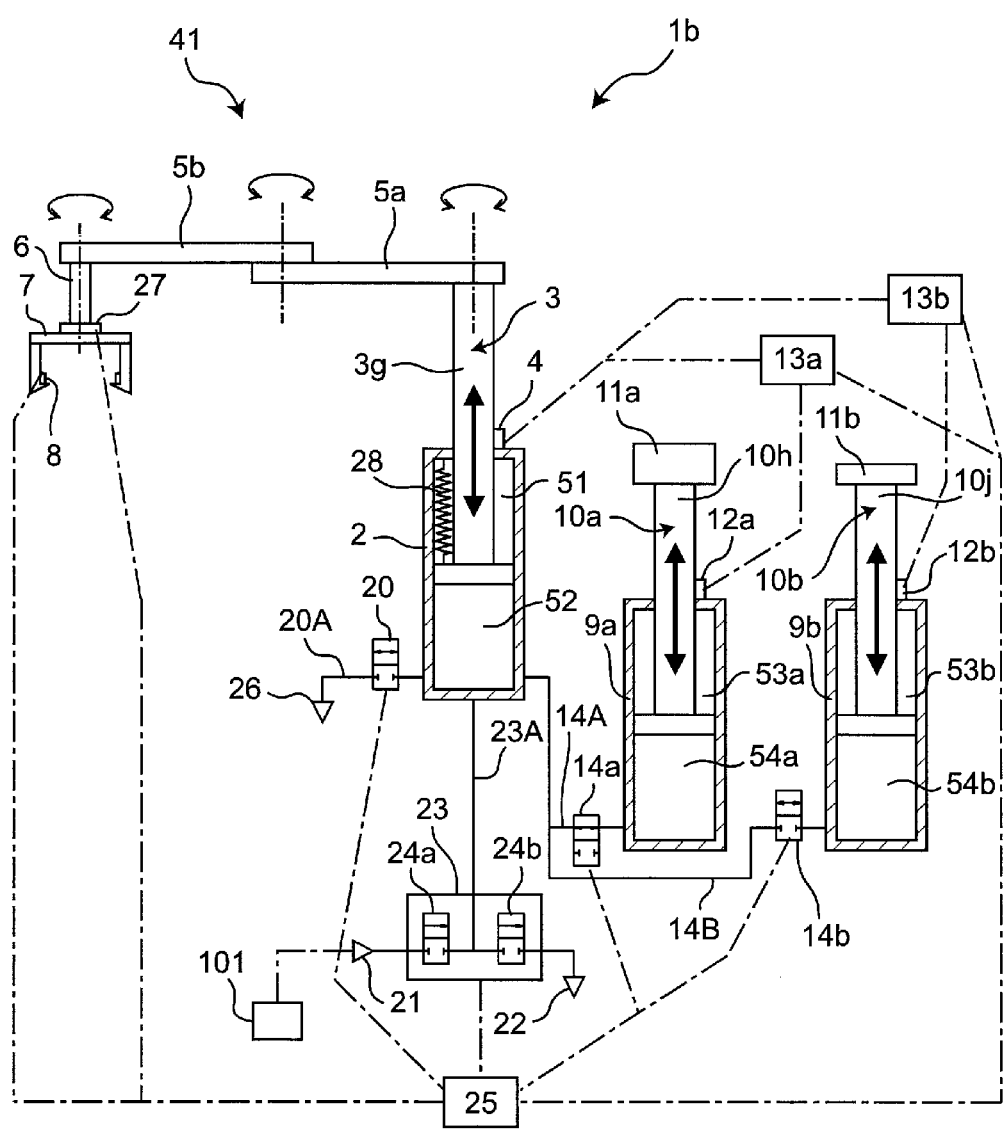
FIG. 4 is a view illustrating the general outline of a gas-pressure type gravity compensation elevator according to a second embodiment of the present invention.

FIG. 4 illustrates the general outline of a gas-pressure type gravity compensation elevator 1b, as an example of a gas-pressure type gravity compensation elevator, according to a second embodiment of the present invention. In the gas-pressure type gravity compensation elevator 1b in FIG. 4, the piston 3 is provided such that the piston 3 can move upwardly and downwardly, in the air cylinder 2 as an example of the gas cylinder. The space 51 which is enclosed by the piston 3 and the air cylinder 2 is opened to the atmosphere and, therefore, is kept under the atmospheric pressure. In the second embodiment, unlike in the first embodiment, a constant-load spring 28 as an example of a self-weighting compensation portion is provided in the space 51. The constant-load spring 28 is adjusted in such a way as to continuously exert, on the piston 3, an upward force equivalent to the sum of the weights of the arm 41 and the piston 3, regardless of the displacement of the constant-load spring 28. Therefore, in cases where the space 51 is under the atmospheric pressure, the arm 41 grasping no load object 100 is brought into a vertically-balanced state, through the constant-load spring 28. The constant-load spring 28 can be constituted by an arbitrary elastic mechanism capable of obtaining the same effects, such as a gas spring having a smaller rate of volume change with respect to the displacement, as well as by an ordinary constant-load spring formed from a closely-wound thin plate. The displacement of the piston 3 is measured by the linear encoder 4. The arm 41 as an example of the elevating mechanism is constituted by the first and second revolving arms 5a and 5b, the shaft 6, and the grasping hand 7. The first revolving arm 5a is coupled, at one end thereof, to the upper end portion of a piston rod 3g in the piston 3 such that the first revolving arm 5a can rotate about a vertical axis. The second revolving arm 5b is coupled, at one end thereof, to another end of the first revolving arm 5a such that the second revolving arm 5b can rotate about a vertical axis. The shaft 6 is coupled, at its upper end, to another end of the second revolving arm 5b, such that the shaft 6 can rotate about a vertical axis. The grasping hand 7 is secured to the tip end (the lower end) of the shaft 6. The grasping hand 7 is provided with a contact sensor (s) 8 as an example of the grasping-state detection portion, and with a hand-width measuring device 27 as an example of a load-object identification portion. Accordingly, the entire arm 41 is enabled to ascend and descend along with the upward and downward movements of the piston 3 and, also, the grasping hand 7 at the tip end of the arm 41 is enabled to move in a horizontal plane, which enables performing loading operations by causing the grasping hand 7 to grasp the load object 100. Namely, similarly to in the first embodiment, in the horizontal direction, a loading operator can arbitrarily revolve the first and second revolving arms 5a and 5b and the shaft 6 about the respective vertical axes, by pressing the arm 41 in a desired direction.

A piston 10a is provided such that the piston 10a can move upwardly and downwardly, in a first constant-pressure air cylinder 9a as an example of the first constant-pressure gas cylinder. A space 53a which is enclosed by the first constant-pressure air cylinder 9a and the piston 10a is opened to the atmosphere and, therefore, is kept under the atmospheric pressure. A weight member 11a as an example of a first constant-load generating portion is secured to the upper portion of the piston 10a (namely, the upper end of a piston rod 10h). The displacement of the piston 10a is measured by a linear encoder 12a placed at the upper end of the first constant-pressure air cylinder 9a. The respective outputs from the linear encoder 4 and the linear encoder 12a are inputted to a volume-sum calculator 13a as an example of the first volume estimation part, which calculates the sum of the volume of the air room 52 enclosed by the air cylinder 2 and the piston 3 (the lower space enclosed by the piston 3 and the lower portion of the air cylinder 2) and the volume of the air room 54a enclosed by the piston 10a and the lower portion of the first constant-pressure air cylinder 9a (the lower space enclosed by the piston 10a and the lower portion of the first constant-pressure the air cylinder 9a). The calculated volume of each of the air rooms is determined, from the product of the cross-sectional area and the length of the air room 52 or 54, by utilizing the fact that the air cylinder 2 and the first constant-pressure air cylinder 9a have constant cross-sectional areas, regardless of the positions of the pistons 3 and 10a. The air room 52 and the air room 54a are connected to each other, through a connection pipe 14A via a first ON/OFF valve 14a as an example of the first connection valve. The first constant-pressure air cylinder 9a has such a size that the change of the volume of the air room 54a (the maximum volume minus the minimum volume) is equal to or more than the change of the volume of the air room 52 (for example, 1.2 times). As the size of the first constant-pressure air cylinder 9a is increased, it has higher resistance to errors or volume changes at the time of changeovers of the ON/OFF valve during volume control, which will be described later, but the entire size is increased. Therefore, for example, the first constant-pressure air cylinder 9a may have such a size that the change of the volume of the air room 54a is 1.1 to 1.3 times the change of the volume of the air room 52. The weight member 11a is made to have the weight determined by dividing the weight of an estimated first load object 100 by the cross-sectional area of the air cylinder 2, further multiplying the result of the division by the cross-sectional area of the first constant-pressure air cylinder 9a and, further, subtracting the weight of the piston 10a from the value resulted from the multiplication. By doing this, when the pressure in the air room 52 is equal to the pressure in the air room 54a, the arm 41 grasping the first load object 100 is brought into a vertically-balanced state, which enables easily performing ascending/descending operations therewith. However, it is not preferable, in view of safety, that ascending/descending operations with the arm 41 are performed at higher speeds. Therefore, for example, the air cylinder 2 may be prevented from being operated at higher speeds, through the flow-path resistance in the first ON/OFF valve 14a. If necessary, it is possible to add a throttle or an excessive-flow-rate shut-off valve to the first ON/OFF valve 14a, in order to further improve the safety.

A piston 10b is provided such that the piston 10b can move upwardly and downwardly, in a third constant-pressure air cylinder 9b as another example of the first constant-pressure gas cylinder. A space (an upper space) 53b which is enclosed by the piston 10b and the upper portion of the third constant-pressure air cylinder 9b is opened to the atmosphere and, therefore, is kept under the atmospheric pressure. A weight member 1b as an example of the first constant-load generating portion is secured to an upper portion of the piston 10b (namely, the upper end of a piston rod 10j). The displacement of the piston 10b is measured by a linear encoder 12b placed at the upper end of the third constant-pressure air cylinder 9b. The respective outputs from the linear encoder 4 and the linear encoder 12b are inputted to a volume-sum calculator 13b as an example of the first volume estimation part, which calculates the sum of the volume of the air room 52 enclosed by the air cylinder 2 and the piston 3 (the lower space enclosed by the piston 3 and the lower portion of the air cylinder 2) and the volume of the air room 54b enclosed by the piston 10b and the lower portion of the third constant-pressure air cylinder 9b (the lower space enclosed by the piston 10 and the lower portion of the third constant-pressure the air cylinder 9b). The calculated volume of each of the air rooms is determined, from the product of the cross-sectional area and the length of the air room 52 or 54b, by utilizing the fact that the air cylinder 2 and the third constant-pressure air cylinder 9b have constant cross-sectional areas, regardless of the positions of the pistons 3 and 10b. The air room 52 and the air room 54b are connected to each other, through a connection pipe 14B via a third ON/OFF valve 14b as an example of the first connection valve. The third constant-pressure air cylinder 9b has such a size that the change of the volume of the air room 54b is equal to or more than the change of the volume of the air room 52 (for example, 1.2 times). As the size of the third constant-pressure air cylinder 9b is increased, it has higher resistance to errors or volume changes at the time of changeovers of the ON/OFF valve during volume control, which will be described later, but the entire size is increased. Therefore, for example, the third constant-pressure air cylinder 9b may have such a size that the change of the volume of the air room 54b is 1.1 to 1.3 times the change of the volume of the air room 52. The weight member 11b is made to have the weight determined by dividing the weight of an estimated second load object having a different weight from that of the first load object by the cross-sectional area of the air cylinder 2, further multiplying the result of the division by the cross-sectional area of the third constant-pressure air cylinder 9b and, further, subtracting the weight of the piston 10b from the value resulted from the multiplication. By doing this, when the pressure in the air room 52 is equal to the pressure in the air room 54b, the arm 41 grasping the second load object 100 is brought into a vertically-balanced state, which enables easily performing ascending/descending operations therewith. However, it is not preferable, in view of safety, that ascending/descending operations with the arm 41 are performed at higher speeds. Therefore, for example, the air cylinder 2 may be prevented from being operated at higher speeds, through the flow-path resistance in the third ON/OFF valve 14b. If necessary, it is possible to add a throttle or an excessive-flow-rate shut-off valve to the third ON/OFF valve 14b, in order to further improve the safety.

The air room 52 in the air cylinder 2 is connected to the ambient atmosphere, through a connection pipe 20A via a second ON/OFF valve 20 as an example of the second connection valve. By doing this, when the second ON/OFF valve 20 for the air room 52 is opened and, thus, the pressure in the air room 52 is made equal to the pressure of the ambient atmosphere, the arm 41 grasping no load object is brought into a vertically-balanced state, which enables easily performing ascending/descending operations therewith. However, it is not preferable, in view of safety, that ascending/descending operations with the arm 41 are performed at higher speeds. Therefore, for example, the air cylinder 2 may be prevented from being operated at higher speeds, through the flow-path resistance in the second ON/OFF valve 20. If necessary, it is possible to add a throttle or an excessive-flow-rate shut-off valve to the second ON/OFF valve 20, in order to further improve the safety.

A valve unit 23 as an example of the changeover valve portion is placed such that the valve unit 23 can be connected to the air room 52 in the air cylinder 2 through a connection pipe 23A and, further, is constituted by third and fourth ON/OFF valves 24a and 24b. The third ON/OFF valve 24a changes the state of the connection between the air room 52 and a compressed-air supply port 21 as an example of the gas supply portion which is connected to a high-pressure source 101, for example. Through the compressed-air supply port 21, compressed air at a pressure exceeding the pressures in the air room 54a and the air room 54b is supplied. In the second embodiment, no matter which of the air room 54a and the air room 54b is connected to the air room 52, compressed air is supplied thereto through the single compressed-air supply port 21. However, it is also possible to provide different compressed-air supply ports for the respective air rooms 54a and 54b, such that a controller 25 makes selections between the compressed-air supply ports. When it has been preliminarily known that the pressure in the air room 54b is lower than the pressure in the air room 54a, for example, it is possible to provide a port for supplying compressed air at a lower pressure, for the air room 54b, which can reduce the energy necessary for the fabrication of the compressed air. The fourth ON/OFF valve 24b changes the state of the connection between an air releasing port 22 and the air room 52 as an example of a low-pressure source or the gas exhaust portion, for example. The controller 25 as an example of the amount-of-gas control part controls the operations of the first ON/OFF valve 14, the second ON/OFF valve 20, and the valve unit 23, independently of each other, while obtaining information about the contact sensor(s) 8, the volume-sum calculator 13, and the volume-sum calculator portion 19. If the third ON/OFF valve 24a is opened, compressed air flows into the air room 52 through the compressed-air supply port 21. If the fourth ON/OFF valve 24b is opened, compressed air flows out from the air room 52 to the air releasing port 22.

Next, there will be described actions of the gas-pressure type gravity compensation elevator 1b, which are performed under the control of the controller 25. FIG. 5 is a flow chart of volume control by the controller 25.

At first, the controller 25 determines whether or not the grasping hand 7 is grasping a load object 100, based on the output from the contact sensor(s) 8 (Step S1 in FIG. 5).

If the controller 25 determines, in the step S1, that the grasping hand 7 is grasping no load object, the controller 25 closes the first ON/OFF valve 14a and the third ON/OFF valve 14b and opens the second ON/OFF valve 20 (Step S16 in FIG. 5). In closing the first ON/OFF value 14a and the third ON/OFF valve 14b and opening the second ON/OFF valve 20, for example, the second ON/OFF valve 20 may be opened after the first ON/OFF valve 14a and the third ON/OFF valve 14b are closed, in order to prevent the occurrence of wasteful air flows from the air rooms 54a and 54b to the ambient atmosphere. The pressure in the air room 52 is made equal to the pressure of the ambient atmosphere, which realizes gravity compensation in the state where the grasping hand 7 is grasping no load object. Thereafter, the control proceeds to a step S15.

On the other hand, if the controller 25 determines, in the step S1, that the grasping hand 7 is grasping a load object, in a step S17, the controller 25 identifies the load object being grasped thereby, based on the output from the hand-width measuring device 27 (Step S17 in FIG. 5). In this case, the identification of the load object is performed, by measuring the hand width through the hand-width measuring device 27, assuming that respective load objects have different widths. However, the present disclosure is not limited thereto, and it can be also performed through determinations based on shapes of load objects other than their widths, based on external appearances of load objects, or by using identifiers such as barcodes or electronic tags.

Next, based on the result of the identification in the step S17, members to be controlled in the following flowchart are selected (Step S18 in FIG. 5). If the controller 25 determines, in the step S17, that the load object is a first load object 100, hereinafter, the first ON/OFF valve 14a, the air room 54a, and the volume-sum calculator 13a are treated as the first ON/OFF valve 14, the air room 54, and the volume-sum calculator 13, respectively. On the other hand, if the controller 25 determines, in the step S17, that the load object is a second load object, hereinafter, the third ON/OFF valve 14b, the air room 54b, and the volume-sum calculator 13b are treated as the first ON/OFF valve 14, the air room 54, and the volume-sum calculator 13, respectively.

Next, in the step S2, the controller 25 closes the second ON/OFF valve 20 and opens the first ON/OFF valve 14. As a result thereof, the air room 52 and the air room 54 are connected to each other. In closing the second ON/OFF value 20 and opening the first ON/OFF valve 14, for example, the first ON/OFF valve 14 may be opened after the second ON/OFF valve 20 is closed, in order to prevent the occurrence of wasteful air flows from the air room 54 to the air room 56. The pressures in the air room 52 and the air room 54 are made equal to each other, which realizes gravity compensation in the state where the grasping hand 7 is grasping the load object.

Next, the controller 25 defines the desired volume sum for the control, as the sum of the average volume of the air room 52 and the average volume of the air room 54 (step S3 in FIG. 5). The average volume of the air room 52 refers to the average of the maximum volume and the minimum volume of the air room 52 when the piston 3 moves upwardly and downwardly. The average volume of the air room 54 refers to the average of the maximum volume and the minimum volume of the air room 54 when the piston 10 moves upwardly and downwardly. Further, the controller 25 defines an estimated volume to be controlled, as the output from the volume-sum calculator 13 (step S4 in FIG. 5). Thereafter, the control proceeds to a step S8.

In the step S8, the controller 25 makes a comparison between the desired volume sum and the estimated volume. If the controller 25 determines that the estimated volume agrees with the desired volume sum, the control proceeds to a step S14. If the controller 25 determines that the estimated volume does not agree with the desired volume sum, the control proceeds to a step S9. It is not indispensable that the agreement between the estimated volume and the desired volume sum be determined strictly by the controller 25. In taking account of designing or calculation errors, it is possible to regard them as agreeing with each other, if the difference therebetween falls within the range of 5% or less, for example. The same will apply to determinations of agreement, which will be described later.

If the control proceeds to the step S9, the controller 25 determines which of the desired volume sum and the estimated volume is larger than the other. If the controller 25 determines that the desired volume sum has exceeded the estimated volume, the controller 25 opens the third ON/OFF valve 24a in the valve unit 23 for connecting the air room 52 to the compressed-air supply port 21, thereby causing compressed air to flow into the air room 52 (step S10 in FIG. 5). Thereafter, this state is continued, until the controller 25 determines that the desired volume sum has gotten to agree with the estimated volume (step S11 in FIG. 5). After the controller 25 determines that they have gotten to agree with each other, the control proceeds to the step S14.

On the other hand, if the controller 25 determines that the desired volume sum has been lowered to below the estimated volume, the controller 25 opens the fourth ON/OFF valve 24b in the valve unit 23 for connecting the air room 52 to the air releasing port 22, thereby causing compressed air to flow out from the air room 52 (step S12 in FIG. 5). Thereafter, this state is continued, until the controller 25 determines that the desired volume sum has gotten to agree with the estimated volume (step S13 in FIG. 5). After the controller 25 determines that they have gotten to agree with each other, the control proceeds to the step S14.

As described above, in performing the volume control, the compressed air is sucked or exhausted in a single direction. For example, this is for the following reason. That is, in the event of overshooting beyond the desired value due to noises, temperature changes or other causes, it is possible to eliminate the necessity of wastefully exhausting, again, the compressed air having been sucked once or wastefully sucking, again, compressed air equivalent to the exhausted compressed air.

In the step S14, the controller 25 closes both the third and fourth ON/OFF valves 24a and 24b in the valve unit 23. Thereafter, this state is continued, until the controller 25 determines that the grasping state has changed, since the output of the contact sensors) 8 has been changed (step S15 in FIG. 5). If the controller 25 determines that the grasping state has changed, the control returns to the step S1 where volume control is started, again.

FIG. 6 illustrates a cumulative amount of exhaust in an example of operations of the gas-pressure type gravity compensation elevator 1b, when the volume control by the controller 25 is performed as described above, in comparison with conventional one.

In FIG. 6, "ARM POSITION" represents the displacement of the arm 41 in the vertical direction.

In FIG. 6, "P52 PRESSURE" represents the pressure in the air room 52. In the example of operations in FIG. 6, an ascending/descending operation is performed by grasping the first load object 100 within an A-to-C interval, while an ascending/descending operation is performed with no load object grasped therein within an C-to-E interval. This simulates a state where first load objects 100 having the same weight are successively moved, plural times, by the gas-pressure type gravity compensation elevator 1b.

In FIG. 6, "P4 OUTPUT" represents the output from the linear encoder 4, namely the displacement of the piston 3, which changes in conjunction with the arm position. The output from the linear encoder 4 can be converted into the volume, by being multiplied by the cross-sectional area of the air cylinder 2. Therefore, the volume change is changed similarly thereto.

In FIG. 6, "P12A OUTPUT" represents the output from the linear encoder 12a, namely the displacement of the piston 10a. Within the A-to-C interval, the controller 25 opens the first ON/OFF valve 14a, and there is no compressed air coming from and going to the outside and, therefore, the piston 10a descends if the piston 3 ascends, and the piston 10a ascends if the piston 3 descends, which maintains the sum of the volumes in the air room 52 and the air room 54a constant. Within the C-to-E interval, the controller 25 closes the first ON/OFF valve 14a, which maintains the volume in the air room 54a constant. At the point E, the controller 25 opens the first ON/OFF valve 14a, again and, at this time, air flows into the air room 52 from the air room 54a in order to make the pressure in the air room 52 equal to the pressure in the air room 54a, which temporarily reduces the volume in the air room 54a, thereby descending the piston 10a. Thereafter, the controller 25 opens the third ON/OFF valve 24a and, thus, controls the sum of the volumes in the air room 52 and the air room 54a such that the sum becomes constant. After the point E, the same operations as those within the A-to-C interval can be performed.

In comparing the cumulative amount of compressed air exhausted during the aforementioned operations, with the conventional one, the compressed air is exhausted only around the point C in the second embodiment of the present invention, while compressed air is continuously exhausted even during the descents of the arm 41 grasping a load object as within the B-to-C interval in cases where the air room 52 is subjected to pressure control as in the conventional manner. This reveals that, by employing the second embodiment of the present invention, it is possible to largely reduce the cumulative amount of exhausted compressed air. The example of operations in FIG. 6 does not represent a state where the second load object is being grasped. However, in this case, it is also possible to reduce the cumulative amount of exhaust, similarly to in the case where the first load object 100 is grasped.

By performing the volume control with the controller 25 as described above, it is possible to provide a gravity compensation effect, regardless of the state of the grasping of a load object. Further, inflows and outflows of compressed air are occurred only when the grasping state has changed. While inflows and outflows have been conventionally occurred throughout ascending/descending operations while load objects are grasped, it is possible to prevent the occurrence of such inflows and outflows, which enables efficient utilization of the energy of the compressed gas. This reduces the amount of compressed gas which is sucked and exhausted during repetitions of ascending/descending operations, thereby reducing the energy consumption.

Further, although, in the first and second embodiments, air is employed as an example of the gas, the present disclosure is not limited thereto and can be also implemented by using other gasses than air. However, the air may be used as one example, since air is inexpensive and easy to handle.

Further, although, in the first and second embodiments, a horizontal multi-articulated type arm is employed as an example of the elevating mechanism, the present disclosure is not limited thereto and, also, can employ other structures for balancing the weights of load objects through forces generated from gas cylinders, such as link-arm type structures or hoist type structures.

Further, although, in the first and second embodiments, a contact sensor is employed for detecting the grasping state, as an example, the present disclosure is not limited thereto and can be also implemented by using a proximity sensor or by measuring the weights of load objects.

Further, although, in the first and second embodiments, a weight member is employed as an example of the constant-load generating portion, the present disclosure is not limited thereto and, also, can employ any well-known methods capable of obtaining the same actions and effects, such as constant-load springs.

Further, although, in the first and second embodiments, two ON/OFF valves are employed as an example of the changeover valve portion, the present disclosure is not limited thereto and, also, can employ other port valves, such as spool valves. The two ON/OFF valves may be used as one example, since it is possible to certainly turn on and off the respective valves.

Further, although, in the first and second embodiments, a compressed-air supply port is employed as an example of the gas supply portion or the high-pressure source, the present disclosure is not limited thereto and, also, can be implemented by employing a high-pressure tank or by directly supplying compressed air from a compressor.

Further, although, in the first and second embodiments, an air releasing port is employed as an example of the low-pressure source or the gas exhaust portion, the present disclosure is not limited thereto and, also, can be implemented by employing a low-pressure tank or through direct suction using a vacuum pump. Such an air releasing port may be used as one example, since it has stabilized characteristics and induces no energy consumption.

Further, although, in the first and second embodiments, the valve unit is adapted to directly suck and exhaust compressed air into and from the air room 52, the present disclosure is not limited thereto, and compressed air can be sucked and exhausted into and from the air room 52, through the air room 54 or the air room 56 or through the air room 54*a* or the air room 54*b*. Such a structure for directly sucking and exhausting compressed air into and from the air room 52 may be used as one example, since this structure enables easily realizing hoisting operations, by operating the valve unit 23 in states where the first ON/OFF valves 14, 14*a*, 14*b* and 20 are closed. On the other hand, such a structure for sucking and exhausting compressed air through the air room 54 or the air room 56 or through the air room 54*a* or the air room 54*b* may be used as one example, since pressure changes due to the suction and exhaust of compressed air tend to be suppressed before being transmitted to the air room 52, through volume changes in the air room 54 or the air room 56 or in the air room 54*a* or the air room 54*b*.

Although the second embodiment is adaptable to two types of load objects, the types of load objects are not limited to two types, and the present disclosure can be also implemented for three or more types of load objects, similarly. The present disclosure can be also implemented, similarly, with a structure provided with a low-pressure-side gas cylinder as in the first embodiment.

Although, in the second embodiment, the air releasing port 22 and the air releasing port 26 are provided independently and, also, the fourth ON/OFF valve 24*b* and the second ON/OFF valve 20 are provided independently, the present disclosure can be also implemented similarly, by providing, thereas, a common air releasing port and a common ON/OFF valve.

Further, although the present disclosure has been described with respect to the first and second embodiments and modification examples, the present disclosure is not limited to the aforementioned first and second embodiments and the aforementioned modification examples, as a matter of course.

For example, the present disclosure is intended to cover the following cases.

In the aforementioned gas-pressure type gravity compensation elevators, apart or entirety of the first volume estimation part, the second volume estimation part, and the amount-of-gas control part is actually a computer system that includes, for example, a microprocessor, ROM, RAM, hard disk unit, display unit, keyboard, mouse, and the like. A computer program is stored on the RAM or the hard disk unit. Functions of each of the first volume estimation part, the second volume estimation part, and the amount-of-gas control part can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements apart or entirety of the first volume estimation part, the second volume estimation part, and the amount-of-gas control part according to each of the above-mentioned embodiments or modifications is a following program. That is to say, in the gas-pressure type gravity compensation elevator according to the above aspects, this program is a control program for gas-pressure type gravity compensation elevator, causing a computer to function as:

the first volume estimation part adapted to estimate, as the estimated value, the sum of the volume in the gas cylinder and the volume in the first constant-pressure gas cylinder;

the second volume estimation part adapted to estimate, as the estimated value, the sum of the volume in the gas cylinder and the volume in the second constant-pressure gas cylinder; and the amount-of-gas control part which is adapted to operate the first connection valve, the second connection valve, and the changeover valve portion for controlling the estimated value from the first volume estimation part such that the estimated value from the first volume estimation part equals to the sum of the average volume of the gas cylinder and the average volume of the first constant-pressure gas cylinder or for controlling the estimated value from the second volume estimation part such that the estimated value from the second volume estimation part equals to the sum of the average volume of the gas cylinder and the average volume of the second constant-pressure gas cylinder, every time the load-object grasping state from the grasping-state detection portion is changed.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment (s) or modification(s) of the aforementioned various embodiments and modifications, the effects possessed by the embodiment (s) or modification(s) can be produced.

The gas-pressure type gravity compensation elevator according to the present disclosure can reduce the amounts of compressed gas sucked and exhausted during ascending/descending operations, which can reduce the energy consumption. Therefore, the gas-pressure type gravity compensation elevator is advantageous. Further, the gas-pressure type gravity compensation elevator according to the present disclosure can be also employed as an assist device for reducing loads in a system for performing ascending/descending operations, rather than as a manual elevator.

The entire disclosure of Japanese Patent Application No. 2011-239193 filed on Oct. 31, 2011, including specification, claims, drawings, and summary are incorporated herein by reference in its entirety.

Although the present disclosure has been sufficiently described with respect to embodiments with reference to the accompanying drawing, various modifications and changes will be apparent to those skilled in the art. It should be understood that the present disclosure encompasses such changes and modifications as fall within the scope of the present disclosure defined by the appended claims.

What is claimed is:

1. A gas-pressure type gravity compensation elevator comprising:
   an elevating mechanism adapted to grasp and ascend/descend a load object;
   a grasping-state detection portion adapted to detect a load-object grasping state of the elevating mechanism;
   a gas cylinder adapted to exert a driving force in a direction of ascent, on the elevating mechanism;
   a first constant-pressure gas cylinder which is pressed by a first constant-load generating portion and is capable of exhibiting a volume change equal to or more than a volume change in the gas cylinder, such that the gas cylinder maintains a pressure which generates a driving force balanced with a weight of the elevating mechanism and a weight of the load object being grasped by the elevating mechanism;
   a first connection valve adapted to open and close a connection pipe which connects the first constant-pressure gas cylinder and the gas cylinder to each other;
   a first volume estimation part adapted to estimate, as an estimated value, a sum of a volume in the gas cylinder and a volume in the first constant-pressure gas cylinder;
   a second constant-pressure gas cylinder which is pressed by a second constant-load generating portion and is capable of exhibiting a volume change equal to or more than the volume change in the gas cylinder, such that the gas cylinder maintains a pressure which generates a driving force balanced with the weight of the elevating mechanism;
   a second connection valve adapted to open and close a connection pipe which connects the second constant-pressure gas cylinder and the gas cylinder to each other;
   a second volume estimation part adapted to estimate, as an estimated value, a sum of the volume in the gas cylinder and a volume in the second constant-pressure gas cylinder;
   a gas supply portion adapted to supply a gas at a pressure exceeding a pressure in the first constant-pressure gas cylinder;
   a gas exhaust portion adapted to exhaust a gas within the second constant-pressure gas cylinder;
   a changeover valve portion adapted to perform a changeover among a state where the gas cylinder is connected to the gas supply portion, a state where the gas cylinder is connected to the gas exhaust portion, and a state where the gas cylinder is interrupted from both the gas supply portion and the gas exhaust portion; and
   an amount-of-gas control part which is adapted to operate the first connection valve, the second connection valve, and the changeover valve portion for controlling the estimated value from the first volume estimation part such that the estimated value from the first volume estimation part equals to a sum of an average volume of the gas cylinder and an average volume of the first constant-pressure gas cylinder or for controlling the estimated value from the second volume estimation part such that the estimated value from the second volume estimation part equals to a sum of the average volume of the gas cylinder and an average volume of the second constant-pressure gas cylinder, every time the load-object grasping state from the grasping-state detection portion is changed.

2. The gas-pressure type gravity compensation elevator according to claim 1, wherein
   the amount-of-gas control part is adapted to connect only one of the gas supply portion and the gas exhaust portion, to the gas cylinder, in operating the changeover valve portion, every time the load-object grasping state from the grasping-state detection portion is changed.

3. The gas-pressure type gravity compensation elevator according to claim 1, wherein
   the second volume estimation part is adapted to estimate a volume sum, as the estimated value, using a displacement of the gas cylinder and a displacement of the second constant-pressure gas cylinder.

4. The gas-pressure type gravity compensation elevator according to claim 1, wherein
   the first volume estimation part is adapted to estimate a volume sum, as the estimated value, using a displacement of the gas cylinder and a displacement of the first constant-pressure gas cylinder.

5. The gas-pressure type gravity compensation elevator according to claim 1, comprising:
   a plurality of combinations of the first constant-load generating portion, the first constant-pressure gas cylinder, the first connection valve, and the first volume estimation part, correspondingly to the respective weights of different load objects, and
   a load-object identification portion adapted to distinguish plural load objects from each other, the load-object identification portion being provided in the grasping-state detection portion,
   wherein
   the amount-of-gas control part is adapted to select a to-be-used combination of the first constant-load generating portion, the first constant-pressure gas cylinder, the first connection valve, and the first volume estimation part, according to the grasped load object which is decided by the grasping-state detection portion and the load-object identification portion.

6. The gas-pressure type gravity compensation elevator according to claim 5, comprising
   gas supply portions corresponding to respective pressures in the first constant-pressure gas cylinders, for the respective combinations of the first constant-load generating portion, the first constant-pressure gas cylinder, the first connection valve, and the first volume estimation part, and
   the changeover valve portion is adapted to select a gas supply portion to be used, according to the grasped load object which is decided by the grasping-state detection portion and the load-object identification portion.

7. A gas-pressure type gravity compensation elevator comprising:

an elevating mechanism adapted to grasp and ascend/descend a load object;
a grasping-state detection portion adapted to detect a load-object grasping state of the elevating mechanism;
a gas cylinder adapted to exert a driving force in a direction of ascent, on the elevating mechanism;
a self-weighting compensation portion adapted to compensate for a weight of the elevating mechanism;
a first constant-pressure gas cylinder which is pressed by a first constant-load generating portion and is capable of exhibiting a volume change equal to or more than a volume change in the gas cylinder, such that the gas cylinder maintains a pressure which generates a driving force balanced with a weight of the load object being grasped by the elevating mechanism;
a first connection valve adapted to open and close a connection pipe which connects the first constant-pressure gas cylinder and the gas cylinder to each other;
a first volume estimation part adapted to estimate, as an estimated value, a sum of a volume in the gas cylinder and a volume in the first constant-pressure gas cylinder;
a second connection valve adapted to open and close a connection pipe which connects the gas cylinder and an ambient atmosphere to each other;
a gas supply portion adapted to supply a gas at a pressure exceeding a pressure in the first constant-pressure gas cylinder;
a changeover valve portion adapted to perform a changeover among a state where the gas cylinder is connected to the gas supply portion, a state where the gas cylinder is connected to the ambient atmosphere, and a state where the gas cylinder is interrupted from both the gas supply portion and the ambient atmosphere; and
an amount-of-gas control part which is adapted to operate the first connection valve, the second connection valve, and the changeover valve portion for controlling the estimated value from the first volume estimation part such that the estimated value from the first volume estimation part equals to a sum of an average volume of the gas cylinder and an average volume of the first constant-pressure gas cylinder or for connecting the gas cylinder to the ambient atmosphere, every time the load-object grasping state from the grasping-state detection portion is changed.

8. The gas-pressure type gravity compensation elevator according to claim 7, wherein
the amount-of-gas control part is adapted to connect only one of the gas supply portion and the ambient atmosphere, to the gas cylinder, in operating the changeover valve portion, every time the load-object grasping state from the grasping-state detection portion is changed.

* * * * *